(12) United States Patent
Bhatawdekar et al.

(10) Patent No.: US 8,166,174 B2
(45) Date of Patent: Apr. 24, 2012

(54) METHODS AND SYSTEMS FOR PROVIDING PROPRIETARY ACCESS TO A SERVER

(75) Inventors: Ameya S. Bhatawdekar, Sammamish, WA (US); Pradeep GanapathyRaj, Bellevue, WA (US); Rajendra H. Vishnumurty, Bellevue, WA (US); Raju R. Iyer, Redmond, WA (US); Sudin Bhat, Redmond, WA (US); Robert Turner, Kirkland, WA (US); Liang Xiao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 870 days.

(21) Appl. No.: 11/260,613

(22) Filed: Oct. 27, 2005

(65) Prior Publication Data

US 2007/0101003 A1    May 3, 2007

(51) Int. Cl.
G06F 15/16    (2006.01)
(52) U.S. Cl. ........................ 709/227; 709/229
(58) Field of Classification Search .................. 709/227, 709/229
See application file for complete search history.

(56) References Cited

U.S. PATENT DOCUMENTS

| | | | | |
|---|---|---|---|---|
| 5,546,584 | A | | 8/1996 | Lundin et al. ................ 395/700 |
| 5,560,008 | A | * | 9/1996 | Johnson et al. ................... 726/5 |
| 5,884,312 | A | * | 3/1999 | Dustan et al. ......................... 1/1 |
| 6,134,591 | A | * | 10/2000 | Nickles ......................... 709/229 |
| 6,751,651 | B2 | | 6/2004 | Crockett ....................... 709/203 |
| 6,782,403 | B1 | | 8/2004 | Kino et al. ................... 707/203 |
| 6,917,939 | B1 | | 7/2005 | Baer et al. ...................... 707/10 |
| 6,986,040 | B1 | * | 1/2006 | Kramer et al. ................ 713/155 |
| 7,113,085 | B2 | * | 9/2006 | Havekost ...................... 340/506 |
| 2003/0120782 | A1 | | 6/2003 | Bortoloso et al. ............ 709/227 |
| 2003/0172164 | A1 | * | 9/2003 | Coughlin ...................... 709/227 |
| 2003/0236650 | A1 | | 12/2003 | Miura et al. .................. 702/188 |
| 2005/0015220 | A1 | | 1/2005 | Ramchandi ................... 702/188 |
| 2005/0015439 | A1 | | 1/2005 | Balaji et al. .................. 709/203 |
| 2005/0108250 | A1 | | 5/2005 | Hunt ............................. 707/10 |
| 2005/0138432 | A1 | | 6/2005 | Ransom et al. .............. 713/201 |
| 2006/0253420 | A1 | * | 11/2006 | Hinton et al. .................... 707/2 |
| 2007/0005786 | A1 | * | 1/2007 | Kumar et al. ................. 709/230 |

OTHER PUBLICATIONS

Planet PDF—Developing with Inter-Application Communication (IAC) by Dave Wraight, Jul. 1, 2004, 5 pages.
Cisco AON: A Network-Based Intelligent Message Routing System, 5 pages.
JBroker Web 2.0 README, 4 pages.

* cited by examiner

Primary Examiner — Karen Tang
(74) Attorney, Agent, or Firm — Merchant & Gould

(57) ABSTRACT

Systems and methods are disclosed for providing proprietary access to a server. The disclosed systems and methods may include receiving a first service request from a client. The first service request may include a client identifier. Furthermore, the disclosed systems and methods may include creating a session identifier when it is determined that the client identifier is valid and transmitting the session identifier to the client. Moreover, the disclosed systems and methods may include receiving a second service request from the client. The second service request may include the session identifier and client data that may have at least one of a proprietary format and a proprietary scheme. In addition, the disclosed systems and methods may include servicing the second service request when it is determined that the session identifier received in the second service request is valid.

20 Claims, 3 Drawing Sheets

METHODS AND SYSTEMS FOR PROVIDING PROPRIETARY ACCESS TO A SERVER

BACKGROUND

A commercial software provider may produce a client application that may be executed, for example, on a client system by an authorized user. From time to time, the authorized user may use the client application to access a server operated by the commercial software provider, for example, in order to obtain data, process data, obtain updated software modules, or carry out other functions related to the client application. In some situations, however, unauthorized persons or enterprises may access or attempt to access the server operated by the commercial software provider. For example, the commercial software provider's competitor may gain unauthorized access to the server operated by the commercial software provider in order to obtain a competitive advantage by taking and/or using resources produced by the commercial software provider. Furthermore, other users who use products produced by the competitor may gain unauthorized access as well for the aforementioned reasons.

While the format and schema for communicating with programming modules on the server operated by the commercial software provider may be in the public domain, in order to guard against unauthorized use, the commercial software provider may attempt to secure the server. For example, the commercial software provider may restrict access to the server using password security schemes used, for example, on the internet. Thus, the conventional strategy is to secure the server using known security processes to restrict access by unauthorized users. This often causes problems because the conventional strategy does not work when the security processes are breached.

In view of the foregoing, there is a need for methods and systems for providing proprietary access to a server more optimally. Furthermore, there is a need for providing proprietary access to a server, for example, even when server security processes are breached.

SUMMARY

Consistent with embodiments of the present invention, systems and methods are disclosed for providing proprietary access to a server.

In accordance with one embodiment, a method for providing proprietary access to a server comprises receiving a first service request from a client, the first service request including a client identifier, creating a session identifier when it is determined that the client identifier is valid, transmitting the session identifier to the client, receiving a second service request from the client, the second service request comprising the session identifier and client data, the client data having at least one of a proprietary format and a proprietary scheme, and servicing the second service request when it is determined that the session identifier received in the second service request is valid.

According to another embodiment, a system for providing proprietary access to a server comprises a memory storage for maintaining a database and a processing unit coupled to the memory storage, wherein the processing unit is operative to receive a first service request from a client, the first service request including a client identifier, create a session identifier when it is determined that the client identifier is valid, transmit the session identifier to the client, receive a second service request from the client, the second service request comprising the session identifier and client data, the client data having at least one of a proprietary format and a proprietary scheme, and service the second service request when it is determined that the session identifier received in the second service request is valid.

In accordance with yet another embodiment, a computer-readable medium which stores a set of instructions which when executed performs a method for providing proprietary access to a server, the method executed by the set of instructions comprising receiving a first service request from a client, the first service request including a client identifier, creating a session identifier when it is determined that the client identifier is valid, transmitting the session identifier to the client, receiving a second service request from the client, the second service request comprising the session identifier and client data, the client data having at least one of a proprietary format and a proprietary scheme, and servicing the second service request when it is determined that the session identifier received in the second service request is valid.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
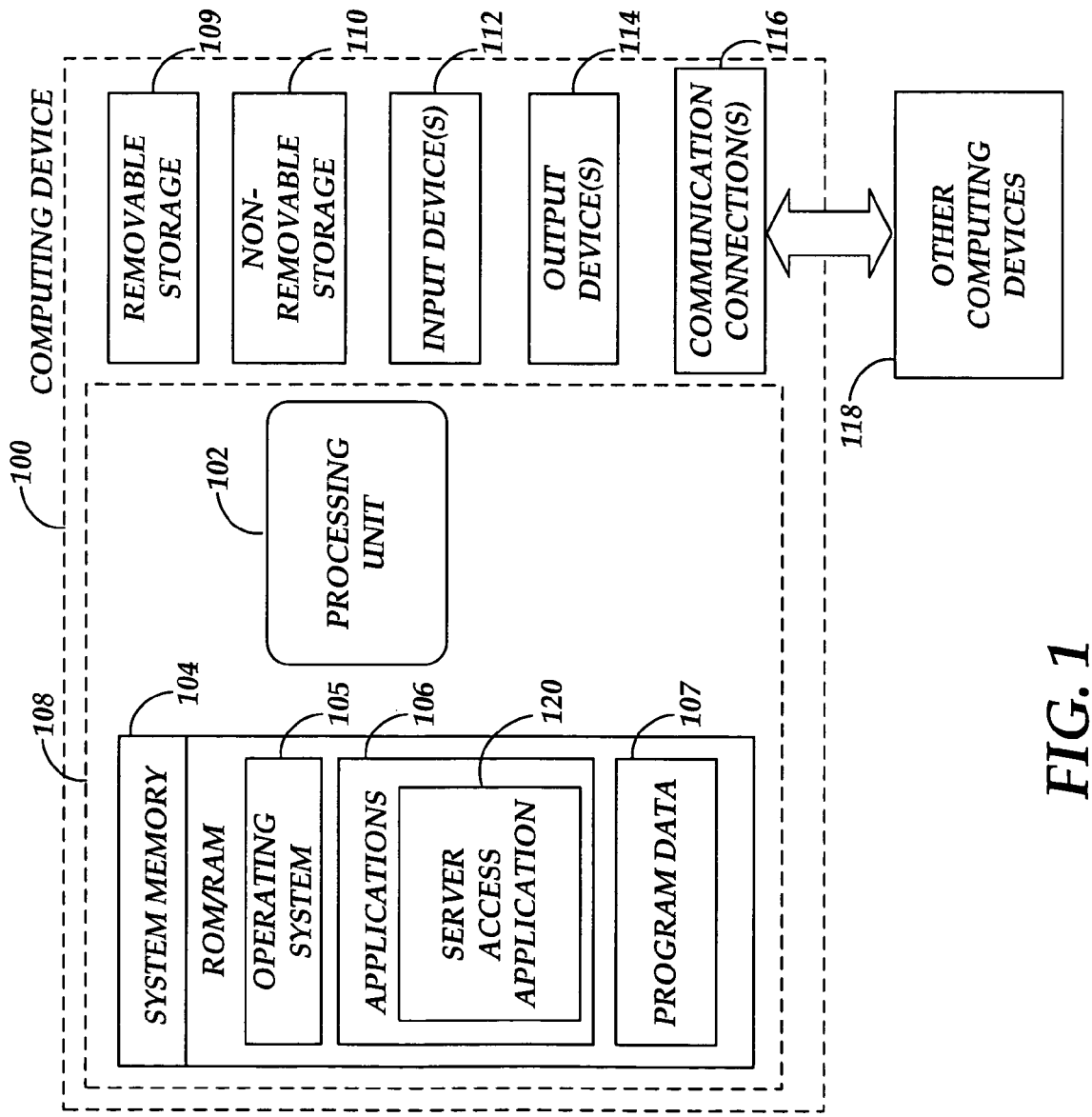
FIG. 1 is a block diagram of an exemplary system including a computing device consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention may provide proprietary access to a server. Consistent with embodiments of the present invention, a commercial software provider may produce a client application that may be executed, for example, on a client system by an authorized user. The authorized user may execute the client application on the client system in order to access programming modules on a server operated by the commercial software provider. Once the server is accessed, the client application may send data to the server and execute the programming modules located on the server in order, for example, to obtain data, process data, obtain updated software modules, or carry out other functions related to the client application.

Consistent with embodiments of the present invention, to keep unauthorized persons or enterprises from executing programming modules located on the server, the format and/or schema for communicating between the programming modules on the server and the client may be proprietary and may be kept from the public domain and authorized users. In other words, while unauthorized users may gain initial access to the server, because the format and/or schema for communicating with any subsequently executed programming modules on the server are proprietary, unauthorized users may not successfully execute the server's programming modules. Because the format and/or schema are proprietary, the unauthorized user does not know how to provide data to the programming modules on the server in order to get the programming modules to execute properly.

Furthermore, because the commercial software provider may provide both the client application and the server programming modules, the server can validate the client application before allowing the client application to execute programming modules on the server. For example, the commercial software provider may configure the client application to send a client identifier to the server. In turn, the server may be programmed to cross reference the client identifier in a table to determine if it is associated with a valid user.

An embodiment consistent with the invention may comprise a system for providing proprietary access to a server. The system may comprise a memory storage for maintaining a database and a processing unit coupled to the memory storage. The processing unit may be operative to receive a first service request from a client. The first service request may include a client identifier. In addition, the processing unit may be operative to create a session identifier when it is determined that the client identifier is valid and transmit the session identifier to the client. Furthermore, the processing unit may be operative to receive a second service request from the client. The second service request may comprise the session identifier and client data. The client data may have at least one of a proprietary format and a proprietary scheme. Moreover, the processing unit may be operative to service the second service request when it is determined that the session identifier received in the second service request is valid.

Consistent with an embodiment of the present invention, the aforementioned memory, processing unit, and other components may be implemented in a computing device, such as an exemplary computing device 100 of FIG. 1. Any suitable combination of hardware, software, and/or firmware may be used to implement the memory, processing unit, or other components. By way of example, the memory, processing unit, or other components may be implemented with any of computing device 100 or any of other computing devices 118, in combination with computing device 100. The aforementioned systems, devices, and processors are exemplary and other systems, devices, and processors may comprise the aforementioned memory, processing unit, or other components, consistent with embodiments of the present invention.

Generally, program modules may include routines, programs, components, data structures, and other types of structures that perform particular tasks or implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system consistent with an embodiment of the invention may include a computing device, such as computing device 100. In a basic configuration, computing device 100 may include at least one processing unit 102 and a system memory 104. Depending on the configuration and type of computing device, system memory 104 may be volatile (such as RAM), non-volatile (such as ROM, flash memory, etc.) or some combination. System memory 104 may include an operating system 105, one or more applications 106, and may include a program data 107. In one embodiment, applications 106 may include a server access application 120. However, embodiments of the invention may be practiced in conjunction with a graphics library, an operating system, or any application program and is not limited to any particular application or system. This basic configuration is illustrated in FIG. 1 by those components within a dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. The aforementioned devices are exemplary and others may be used.

Computing device 100 may also contain a communication connection 116 that may allow device 100 to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein may include both storage media and communication media.

A number of program modules and data files may be stored in system memory 104 of computing device 100, including an operating system 105 suitable for controlling the operation of a networked personal computer, such as the WINDOWS operating systems from MICROSOFT CORPORATION of Redmond, Wash. System memory 104 may also store one or more program modules, such as server access application 120, and others described below. While executing on processing unit 102, server access application 120 may perform processes including, for example, one or more of the stages of the methods described below. The aforementioned process is exemplary, and processing unit 102 may perform other processes. Other applications 106 that may be used in accordance with embodiments of the present invention may include electronic mail and contacts applications, word processing applications, spreadsheet applications, database applications, slide presentation applications, project management applications, drawing or computer-aided application programs, etc.

Figure 2:
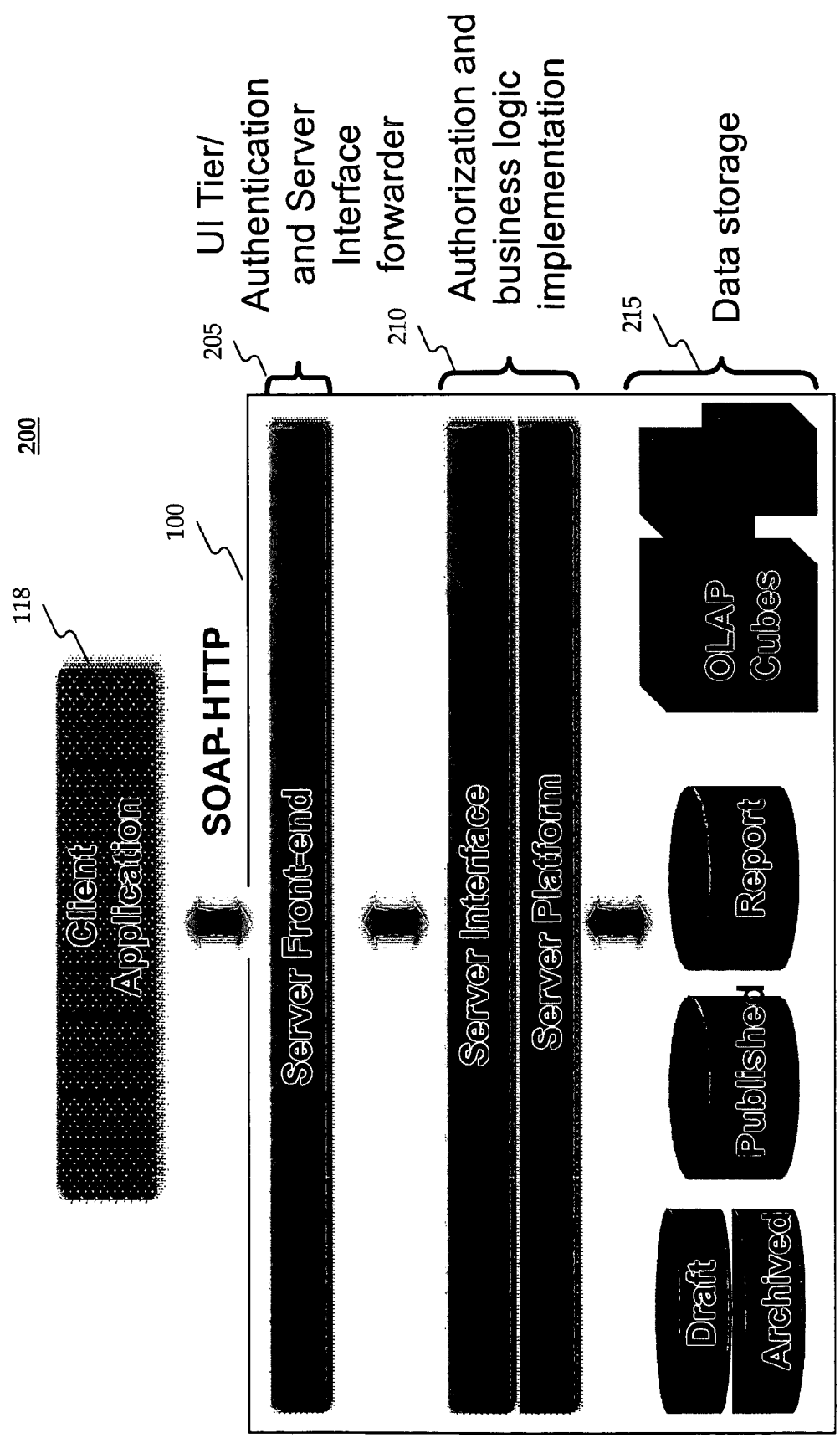
FIG. 2 is a block diagram of an exemplary proprietary server access system consistent with an embodiment of the present invention.

FIG. 2 is a block diagram of an exemplary proprietary server access system 200 consistent with an embodiment of the present invention. System 200 includes computing device 100 and other computing device 118. As described above, computing device 100 may comprise the server and other computing device 118 may comprise the client. As shown in FIG. 2, computing device 100 may include a server front-end 205, a server interface 210, and a data storage 215.

Server front-end 205 may comprise a front end web user interface (UI) running, for example, Internet Information Services (IIS) and Active Server Page (ASP.NET) and may comprise a gateway to the server. Server front-end 205, in addition to being a front end web UI layer, may also be responsible for implementing a first level of authentication and basic authorization (e.g. validate the client identifier and the session identifier.) Server front-end 205 may also act as a "forwarder" for server interface 210.

Server interface 210 may be the externally exposed application program interface (API) layer for a client application operating on other computing device 118. All data may be exposed through server interface 210's layer. For example, any data and functionality that is accessed by the client application may be able to gather that data and invoke the server side functionality through server interface 210.

The system shown in FIG. 2 may be exposed to the outside world. Server interface 210's API's may be factored into two different kinds: 1) Generic access API's that are standard well documented; and 2) Proprietary API's that are tailored specifically for communication with the client application on other computing device 118. Access to the proprietary API's may be limited to calls coming from the client application. These calls may be passed back and forth between computing device 100 and other computing device 118, for example, as blobs of binary data for the fastest performance possible.

Data may be transferred between computing device 100 and other computing device 118 over hypertext transport protocol (HTTP) using simple object access protocol (SOAP). HTTP is the communications protocol used to connect to servers on the Web. Its primary function is to establish a connection with a Web server and transmit HTML pages to the client browser or any other files required by an HTTP application. Simple Object Access Protocol is message-based protocol based on extensible markup language (XML) for accessing services on the Web. It employs XML syntax to send text commands across the Internet using HTTP.

Figure 3:
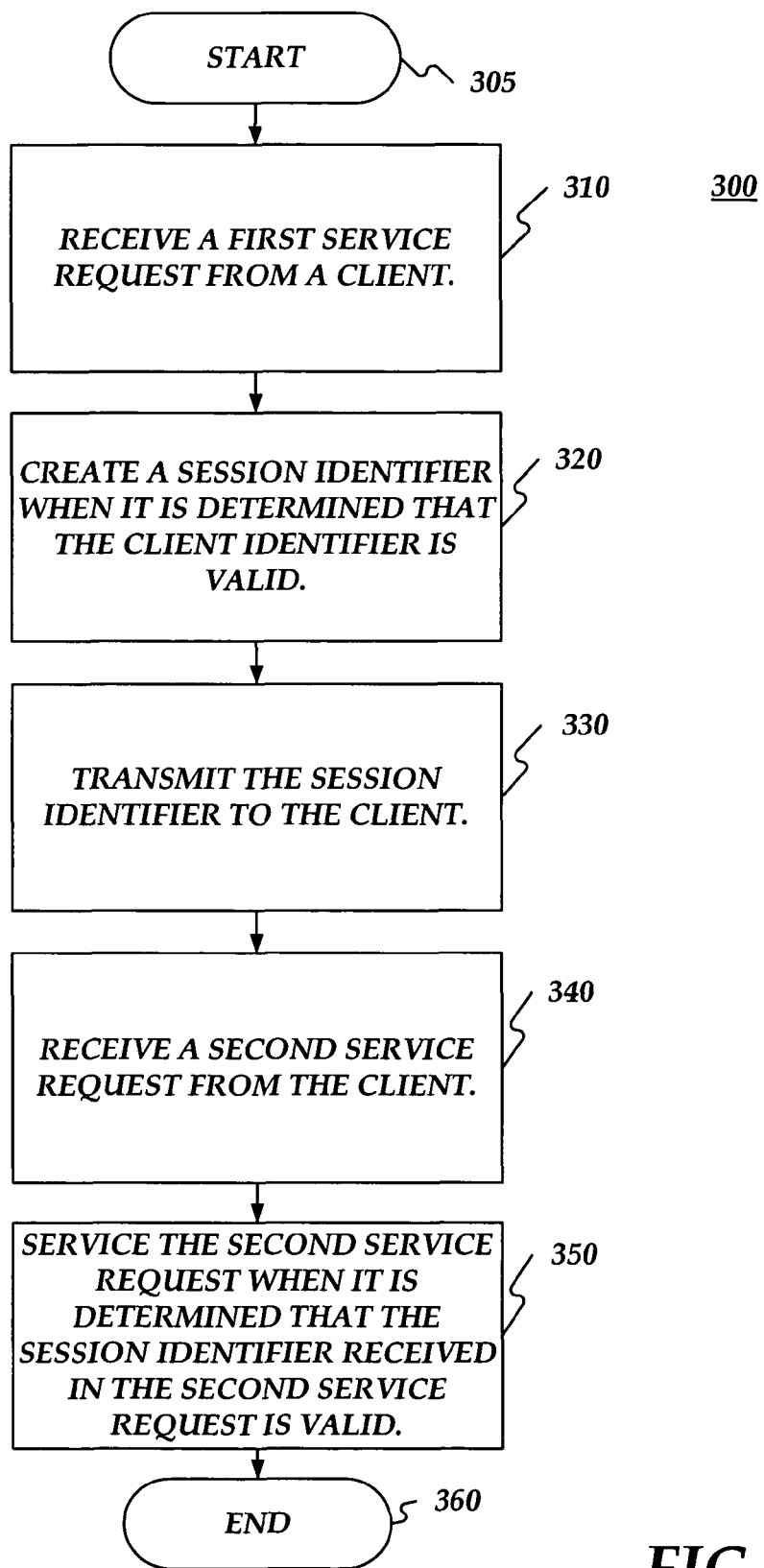
FIG. 3 is a flow chart of an exemplary method for providing proprietary access to a server consistent with an embodiment of the present invention.

FIG. 3 is a flow chart setting forth the general stages involved in an exemplary method 300 consistent with the invention for providing proprietary access to a server using system 100 of FIG. 1 and/or system 200 of FIG. 2. Exemplary ways to implement the stages of exemplary method 300 will be described in greater detail below. Communications performed by any of exemplary method 300's stages may be performed over hypertext transport protocol (HTTP) using simple object access protocol (SOAP). Exemplary method 300 may begin at starting block 305 and proceed to stage 310 where computing device 100 may receive a first service request from a client. The first service request may include a client identifier. For example, the first service request, including the client identifier, may be sent from a client application running on other computing device 118. The first service request may be configured to specify a first proprietary programming module on the server for servicing a second service request. The first proprietary programming module may be selected from a plurality of programming modules on the server. The plurality of programming modules may comprise both proprietary and non-proprietary programming modules.

From stage 310, where computing device 100 receives the first service request from the client, exemplary method 300 may advance to stage 320 where computing device 100 may create a session identifier when it is determined that the client identifier is valid. For example, the session identifier may be created when it is determined by computing device 100 that the client identifier is valid by determining that the client identifier is associated with one or both of a hardware element and a software module approved, for example, by a server administrator. The server administrator may comprise the commercial software provider, who, for example, provided the client application. For example, computing device 100 may have a table of authorized client devices or client software modules stored in memory. Accordingly, once the client identifier is received, the table can be queried for authorization.

Once computing device 100 creates the session identifier in stage 320, exemplary method 300 may continue to stage 330 where computing device 100 may transmit the session identifier to the client. For example, computing device 100 may send the session identifier to other computing device 118. After computing device 100 transmits the session identifier to the client in stage 330, exemplary method 300 may proceed to stage 340 where computing device 100 may receive a second service request from the client. The second service request may comprise the session identifier and client data. The client data may have a proprietary format and/or a proprietary scheme.

From stage 340, where computing device 100 receives the second service request from the client, exemplary method 300 may advance to stage 350 where computing device 100 may service the second service request when it is determined that the session identifier received in the second service request is valid. For example, the second service request may be serviced when it is determined that the session identifier received in the second service request corresponds to the session identifier previously transmitted to the client. In other words, the received session identifier may be analyzed to determine that it is the same as the previously sent session identifier. Moreover, computing device 100 may analyze the second service request to determine if it is consistent with the proprietary format and/or the proprietary scheme. Once this is done, computing device 100 may process the client data with the client application to create server data having at least one of the proprietary format and the proprietary scheme. Then computing device 100 may transmit the server data to other computing device 118 (e.g. the client.) After computing device 100 services the second service request in stage 350, exemplary method 300 may then end at stage 360.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for providing proprietary access to a server, the method comprising:

receiving a first service request from a client operating on a client application configured to transmit a client identifier to the server operating on a server application associated with the client application, the first service request including the client identifier, wherein receiving the first service request from the client operating on the client application comprises receiving a request to access a proprietary module associated with the client application, the proprietary module being specified by the first request;

cross referencing the client identifier in a table to associate the client identifier with a valid user, the table comprising valid client devices and proprietary modules associated with the valid client devices;

creating a session identifier upon determining the client identifier is valid and that the proprietary module is associated with the client identifier is valid;

transmitting the session identifier to the client;

providing a proprietary interface specially tailored for communication with the client application, the proprietary interface being associated with the proprietary module;

receiving a second service request from the client, the second service request comprising the session identifier and client data in a proprietary scheme associated with the proprietary module, the proprietary communication scheme comprising a proprietary protocol for communicating the client data with the server; and servicing the second service request, the second service request being associated with the previously transmitted session identifier.

2. The method of claim 1, wherein receiving the first service request comprises receiving the first service request configured to specify both proprietary modules and non-proprietary modules.

3. The method of claim 1, wherein creating the session identifier upon determining the client identifier is valid comprises determining whether the client identifier is associated with at least one of a hardware element approved by an administrator of the server and a software module approved by the administrator of the server.

4. The method of claim 1, wherein servicing the second service request upon determining the session identifier received in the second service request is valid comprises servicing the second service request upon determining the session identifier received in the second service request corresponds to the session identifier transmitted to the client.

5. The method of claim 1, wherein servicing the second service request comprises servicing the second service request upon determining the client data associated with the received second service is consistent with at least one of the following: the proprietary format and the proprietary scheme.

6. The method of claim 1, wherein servicing the second service request comprises:
processing the client data to create server data having at least one of the proprietary format and the proprietary scheme; and
transmitting the server data to the client.

7. The method of claim 1, wherein at least one of the following: receiving the first service request, transmitting the session identifier, and receiving the second service request is performed over hypertext transport protocol (HTTP) using simple object access protocol (SOAP).

8. A system for providing proprietary access to a server, the system comprising:
a memory storage for maintaining a database; and
a processing unit coupled to the memory storage, wherein the processing unit is operative to:
receive a first service request from a client operating on a client application configured to transmit a client identifier to the server, the first service request including the client identifier and a request to access a proprietary module associated with the client application, the proprietary module being specified by the first service request;
cross reference the client identifier in a table to associate the client identifier with a valid user, the table comprising a listing of valid clients and proprietary modules associated with the valid clients;
create a session identifier upon a first determination that the client identifier is valid and that the specified proprietary module is associated with the client;
transmit the session identifier to the client;
receive a second service request from the client, the second service request comprising client data, wherein the second service request comprising the client data is configured to be received in a proprietary communication scheme associated with the specified proprietary module, the proprietary communication scheme being configured to include a proprietary form of data provision between the client and the proprietary module structured to reside on the server; and
service the second service request upon a second determination that the session identifier received in the second service request is valid, wherein the processing unit being operative to service the second request comprises the processing unit being operative to employ the proprietary module in the proprietary communication scheme to communicate with the client application.

9. The system of claim 8, wherein the processing unit being operative to receive the first service request comprises the processing unit being operative to receive the first service request configured to specify both proprietary modules and non-proprietary modules.

10. The system of claim 8, wherein the processing unit being operative to create the session identifier upon determining the client identifier is valid comprises the processing unit being operative to determine whether the client identifier is associated with at least one of a hardware element approved by an administrator of the server and a software module approved by the administrator of the server.

11. The system of claim 8, wherein the processing unit being operative to service the second service request upon determining the session identifier received in the second service request is valid comprises the processing unit being operative to service the second service request upon determining the session identifier received in the second service request corresponds to the session identifier transmitted to the client.

12. The system of claim 8, wherein the processing unit being operative to service the second service request comprises the processing unit being operative to service the second service request upon determining the client data associated with the received second service is consistent with at least one of the following: the proprietary format and the proprietary scheme.

13. The system of claim 8, wherein the processing unit being operative to service the second service request comprises the processing unit being operative to:
process the client data to create server data having at least one of the proprietary format and the proprietary scheme; and
transmit the server data to the client.

14. A method for providing proprietary access to a computing device, the method comprising:
providing, on a front-end server coupled to the computing device, a web user interface implementing authentication and authorization services, wherein the web user interface is a proprietary interface specifically tailored to a client application and is configured to be operatively associated with the client application running on a remote client device;
receiving a first service request from the remote client device operating on the client application configured to transmit a client identifier to the computing device, the first service request including the client identifier and specifying a program module to be accessed by the remote client device;
cross referencing the client identifier in a table to associate the client identifier with a valid user, the table being stored on the computing device and having authorized client devices and authorized client software modules stored in a memory associated with the computing device;
creating a session identifier upon determining that the client identifier is valid and that the specified proprietary module is associated with the client identifier;
transmitting the session identifier to the remote client device;
receiving a second service request from the remote client device, the second service request comprising the session identifier and client data communicated in a proprietary communication scheme associated with the proprietary module, the proprietary communication scheme including a proprietary form of data provision between the client and a proprietary module residing on the server; and
determining that the second service request corresponds to the previously transmitted session identifier; and
servicing, upon determining that the second service request corresponds to the previously transmitted session identifier, the second service request upon determining the session identifier received in the second service request is valid, wherein servicing the second service request comprises employing the proprietary module in the proprietary communication scheme to communicate with the client application.

15. The method of claim 14, wherein receiving the first service request comprises receiving the first service request configured to specify a both proprietary programming modules and non-proprietary programming modules.

16. The method of claim 14, wherein creating the session identifier upon determining the client identifier is valid comprises determining whether the client identifier is associated with at least one of a hardware element approved by an administrator of the computing device and a software module approved by the administrator of the computing device.

17. The method of claim 14, wherein servicing the second service request upon determining the session identifier received in the second service request is valid comprises servicing the second service request upon determining the session identifier received in the second service request corresponds to the session identifier transmitted to the remote client device.

18. The method of claim 14, wherein servicing the second service request comprises servicing the second service request upon determining the client data associated with the received second service is consistent with at least one of the proprietary format and the proprietary scheme.

19. The method of claim 14, wherein servicing the second service request comprises:
    processing the client data to create server data having at least one of the proprietary format and the proprietary scheme; and
    transmitting the server data to the remote client device.

20. The method of claim 14, wherein at least one of receiving the first service request, transmitting the session identifier, and receiving the second service request is performed over hypertext transport protocol (HTTP) using simple object access protocol (SOAP).

* * * * *